(12) United States Patent
Schweng

(10) Patent No.: US 7,567,732 B2
(45) Date of Patent: Jul. 28, 2009

(54) IMAGE RESOLUTION CONVERSION

(75) Inventor: Detlef Schweng, Weinstadt-Schnait (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 820 days.

(21) Appl. No.: 10/830,329

(22) Filed: Apr. 22, 2004

(65) Prior Publication Data

US 2005/0226540 A1 Oct. 13, 2005

(30) Foreign Application Priority Data

Mar. 30, 2004 (EP) .................................. 04392013

(51) Int. Cl.
*G06K 9/40* (2006.01)
(52) U.S. Cl. ................... 382/299; 382/260; 382/300; 382/132; 345/472; 358/1.9; 348/581
(58) Field of Classification Search ............... 382/260, 382/299, 300, 132; 395/109; 345/472; 358/1.9; 348/581
See application file for complete search history.

(56) References Cited

U.S. PATENT DOCUMENTS

| | | | | |
|---|---|---|---|---|
| 5,457,772 A * | 10/1995 | Shannon | ..................... | 358/1.9 |
| 5,548,689 A * | 8/1996 | Poppenga et al. | ............ | 358/1.9 |
| 5,689,425 A * | 11/1997 | Sainio et al. | ................. | 700/124 |
| 5,691,768 A * | 11/1997 | Civanlar et al. | ........ | 375/240.01 |
| 5,740,267 A * | 4/1998 | Echerer et al. | .............. | 382/132 |
| 6,011,566 A * | 1/2000 | Salamon | ..................... | 345/600 |
| 6,047,085 A * | 4/2000 | Sato et al. | .................... | 382/165 |
| 6,252,906 B1 * | 6/2001 | Canfield | ................. | 375/240.21 |
| 6,424,381 B1 * | 7/2002 | Mendenhall et al. | ........ | 348/581 |
| 6,453,074 B1 * | 9/2002 | Zheng | ......................... | 382/260 |
| 6,546,157 B1 * | 4/2003 | Okuno et al. | ............... | 382/300 |
| 6,650,772 B1 * | 11/2003 | Inoue et al. | .................. | 382/162 |
| 6,987,880 B2 * | 1/2006 | Dolan et al. | ................ | 382/165 |
| 7,046,399 B2 * | 5/2006 | Endo | ......................... | 358/3.26 |
| 7,196,821 B2 * | 3/2007 | Kakutani | .................... | 358/3.03 |
| 7,218,355 B2 * | 5/2007 | Zhou et al. | .................. | 348/452 |
| 2002/0033973 A1 * | 3/2002 | Dolan et al. | ................ | 358/449 |
| 2002/0101618 A1 * | 8/2002 | Endo | ......................... | 358/3.22 |
| 2002/0136451 A1 * | 9/2002 | Dolan et al. | ................ | 382/165 |
| 2002/0154123 A1 * | 10/2002 | Harasimiuk | ................. | 345/472 |

FOREIGN PATENT DOCUMENTS

| | | | |
|---|---|---|---|
| EP | 709825 A | 5/1996 |
| EP | 811950 A | 12/1997 |

* cited by examiner

*Primary Examiner*—Brian Q Le
*Assistant Examiner*—Aklilu k Woldemariam
(74) *Attorney, Agent, or Firm*—Saile Ackerman LLC; Stephen B. Ackerman

(57) ABSTRACT

Methods to convert the resolution of digital images have been achieved. The methods invented support the decrease or the increase of the resolution of digital images, even enlargement in one direction and decimation in the other direction. The methods invented are applicable for any color space used. In case of decimation the method invented combines an interpolation of source pixels to calculate the color values of the destination pixels and omitting some rows of source pixels. A linear interpolation method is used to get a fast result of the interpolation. In case of an enlargement of a digital image in one or two directions the method invented combines the calculation of the color values of the destination pixels by an interpolation of the nearest source pixels with an extrapolation of the destination pixels being close to the edge of the image according to the scale of the conversion of resolution in one or two directions.

31 Claims, 3 Drawing Sheets o destination
x source

IMAGE RESOLUTION CONVERSION

BACKGROUND OF THE INVENTION (1) Field of the Invention

This invention relates generally to image processing and relates more particularly to methods to convert the resolution of digital images.

(2) Description of the Prior Art

Resolution conversion or scaling reduces the size of a digital image through a process called decimation, or enlarges the size by replication or interpolation. The amount of storage needed to store digital images is directly depending upon the resolution used. Decimation removes pixels in a frame to reduce the size of an image and to reduce the amount of storage needed to store or to process said image. Replication enlarges images by duplicating pixels; Interpolation can be used for decimation and for enlargement by averaging the values of neighboring pixels.

Usually different color spaces are being used to describe color images. YUV and YcbCr color spaces are getting more and more important.

The YUV color space is characterized by the luminance (brightness), "Y", being retained separately from the chrominance (color). There is a simple mathematical transformation from RGB: Y is approximately 30% Red, 60% Green, and 10% Blue, the same as the definition of white above. U and V are computed by removing the "brightness" factor from the colors. By definition, U=Blue−Yellow, thus U represents colors from blue (U>0) to yellow (U<0). Likewise V=Red−Yellow, thus V represents colors from magenta (V>0) to Cyan (blue green) (V<0)

The YCbCr color space was developed as part of recommendation CCIR601. YCbCr color space is closely related to the YUV space, but with the coordinates shifted to allow all positive valued coefficients:

$Cb=(U/2)+0.5$ $Cr=(V/1.6)+0.5$

When a video waveform is digitized so that 100 pixels are produced, but only every other one is stored or used, the video waveform is decimated by a factor of 2:1. The image is now ¼ of its original size, since ¾ of the data is missing. If only one out of five pixels were used, then the image would be decimated by a factor of 5:1, and the image would be ½₅ its original size. This kind of decimation, then, is a quick-and-easy method for image scaling and is in fact the method used by low-cost systems that scale video into a window. Decimation can be performed in several ways. One way is the method just described, where data is literally thrown away. Even though this technique is easy to implement and cheap to build, it generally introduces image artifacts unacceptable to medium- to high-end customers. Another method is to use a decimation filter. This reduces the image artifacts to an acceptable level by smoothing them out, but is more costly to implement than the method of just throwing data away.

Interpolation is a mathematical way of regenerating missing or needed information. If, for example, an image needs to be scaled up by a factor of two, from 100 pixels to 200 pixels, interpolation is one possibility to perform said enlargement. Interpolating between the existing pixels of the original image generates the missing pixels. Another method is the replication of existing pixels. It is obvious that simple replication of existing pixels is a quick-and-easy solution but does not the same quality as an interpolation of pixels.

The challenge of the designer of image systems is to develop methods either to reduce or to enlarge images that are fast and easy and still provide high quality images.

There are various solutions dealing with said design problem:

U.S. patent (U.S. Pat. No. 6,453,074 to Zheng.) describes an image decimation of a high-resolution input image so as to obtain a decimated low-resolution image. Image decimation includes adaptive pre-filtering in which a pixel-by-pixel determination is made of busyness in the neighborhood of a target pixel, and based on the determination of busyness a low-pass filter is selectively and adaptively applied prior to sub-sampling to obtain the decimated image.

U.S. patent (U.S. Pat. No. 6,424,381 to Mendenhall et al.) discloses a video decoder decimation of an input image to produce a decimated output image. The video decoder uses approximately every line of pixels in the input image to compute the lines of pixels in the decimated image. The video decoder includes a vertical decimation filter that computes an average, and preferably a weighted average, of luminance (luma) values associated with pixels from each of four lines in the input image. The decimation filter preferably computes a weighted average of lumas from four adjacent lines of pixels from the input image, which may represent a frame, or a field of video data. The weighted average preferably uses coefficients that weight each luma in the calculation differently. After calculating all of the luma values for a particular line of the decimated image, the line number associated with the first of the four adjacent lines is incremented by four (in a field-based system) to determine the initial line number for calculating the next line in the decimated image. The new initial line number thus represents the first line number of the set of four adjacent lines used to calculate the new line in the decimated image. This technique advantageously results in a high quality decimated image because each line from the initial image is used to compute the decimated image.

U.S. patent (U.S. Pat. No. 6,252,906 to Canfield) describes a video processor receiving coded digital image data, which is decoded into MPEG compatible pixel blocks. The pixel blocks are horizontally and vertically decimated to produce a reduced size image suitable for picture-in-picture, picture-on-picture, or picture-in-graphics display. Decoded input data to the decimation network is alias filtered and decimated at a factor of 8 to 3. Decimated output pixel data is derived solely from a respectively associated decoded input pixel block.

SUMMARY OF THE INVENTION

A principal object of the present invention is to achieve a fast and efficient way to convert the resolution of digital images.

Another object of the present invention is to achieve one common method to decimate or to enlarge a digital image.

Another object of the invention is to be able to implement the method invented through one common software program.

In accordance with the object of this invention a method to convert the resolution of a digital color image using any color space has been achieved. Said method comprises the following steps: (1) calculate scale of conversion in x- and y-direction, (2) calculate number of rows of pixels of destination image according to scale of conversion desired in y-direction, (3) calculate number of pixels contained in a row of pixels of destination image according to scale of conversion desired in x-direction, and (4) calculate color values of each pixel along the rows of pixels of the destination image by interpolation from nearest row of pixels of source image.

In accordance with the object of this invention another method to convert the resolution of a digital color image using any color space has been achieved. Said method comprises the following steps: (1) calculate scale of conversion in x- and y-direction, (2) calculate number of columns of pixels of destination image according to scale of conversion desired in x-direction, (3) calculate number of pixels contained in a column of pixels of destination image according to scale of conversion desired in y-direction, and (4) calculate color values of columns of pixels of destination image by interpolation from nearest column of pixels of source image.

In accordance with the object of this invention another method to convert the resolution of a digital color image using any color space has been achieved. Said method comprises the following steps: (1) calculate the scale of decimation in x- and y-direction, (2) calculate number of rows of pixels of destination image according to scale of conversion desired in y-direction, (3) calculate number of pixels contained in a row of pixels of destination image according to scale of conversion desired in x-direction, (4) calculate x, y virtual starting point of destination pixel for each frame, (5) calculate virtual location of first destination pixel for new row in x-direction and interpolate new color values of color space of said first destination pixel from nearest source pixels located at nearest row of source pixels in y-direction, (6) calculate virtual position of next destination pixel in x-direction according to scale factor and interpolate new color values of color space used of said next pixel from nearest source pixels located at nearest row of source pixels in y-direction, (7) go to next step (8) if last destination pixel in x-direction has been reached otherwise go to step (6), (8) go to exit (10) if last row of destination pixels has been reached otherwise go to next step (9), (9) calculate virtual location of next row in y-direction according to scale factor in y-direction and go to step (5), and (8) exit.

In accordance with the object of this invention another method to convert the resolution of a digital color image using any color space has been achieved. Said method comprises the following steps: (1) calculate the scale of decimation in x- and y-direction, (2) calculate number of columns of pixels of destination image according to scale of conversion desired in x-direction, (3) calculate number of pixels contained in a column of pixels of destination image according to scale of conversion desired in y-direction, (4) calculate x, y virtual starting point of destination pixel for each frame, (5) calculate virtual location of first destination pixel for new column in y-direction and interpolate new color values of color space of said first destination pixel from nearest source pixels located at nearest column of source pixels in x-direction, (6) calculate virtual position of next destination pixel in y-direction according to scale factor and interpolate new color values of color space used of said next pixel from nearest source pixels located at nearest column of source pixels in x-direction, (7) go to next step (8) if last destination pixel in y-direction has been reached otherwise go to step (6), (8) go to exit (10) if last column of destination pixels has been reached otherwise go to next step (9), (9) calculate virtual location of next column in x-direction according to scale factor in x-direction and go to step (5), and (8) exit.

BRIEF DESCRIPTION OF THE DRAWINGS

In the accompanying drawings forming a material part of this description, there is shown:

FIG. 1b describes principally how color values of destination pixels get interpolated according to the decimation shown in FIG. 1a.

FIG. 3a shows an example of an increase of the resolution of a digital source image FIG. 3b describes principally color values of destination pixels get interpolated according to the resolution increase shown in FIG. 3a.

DESCRIPTION OF THE PREFERRED EMBODIMENTS

The preferred embodiments disclose novel methods to decrease or increase the resolution of digital images. Said resolution conversion will generate either a smaller or a larger format of a digital image (decimation or enlargement). The objective of the novel methods invented is to achieve a very fast and simple way to decrease or to increase the resolution of digital images and still maintain an acceptable quality of the images. In case of a decimation of the resolution of a digital image the method invented comprises a combination of using simultaneously two different procedures, first, a decimation filter, or interpolation, along one coordinate to calculate the color values of the destination pixels and, second, omitting some rows of source pixels along the other coordinate of an image according to the scale of conversion. In case of an increase of the resolution of a digital image the method invented comprises a similar combination of procedures, first, an interpolation of source pixels to calculate the color values of the increased number of destination pixels, second, an extrapolation of the color values of the destination pixels being very close to the edges of the destination image, and, third, a replication of rows of the destination image to gain additional rows of destination pixels according to the scale of enlargement.

The methods invented apply to video images as well to still images of a digital camera.

Figure 1A:
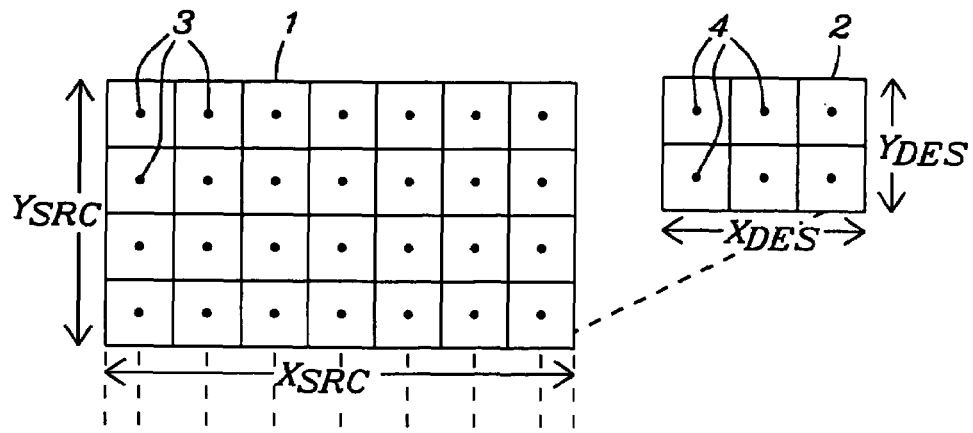
FIG. 1a shows an example of a decimation of a source image.

FIG. 1a shows a principal decimation of a digital image from, e.g., a resolution of 7×4 pixels to a resolution of 3×2 pixels. The source image 1 has seven source pixels 3 in x-direction and four source pixels 3 in y-direction. The destination image 2 has three destination pixels 4 in x-direction and two destination pixels 4 in y-direction. Consequently the destination image is smaller than the source image.

Figure 1B:
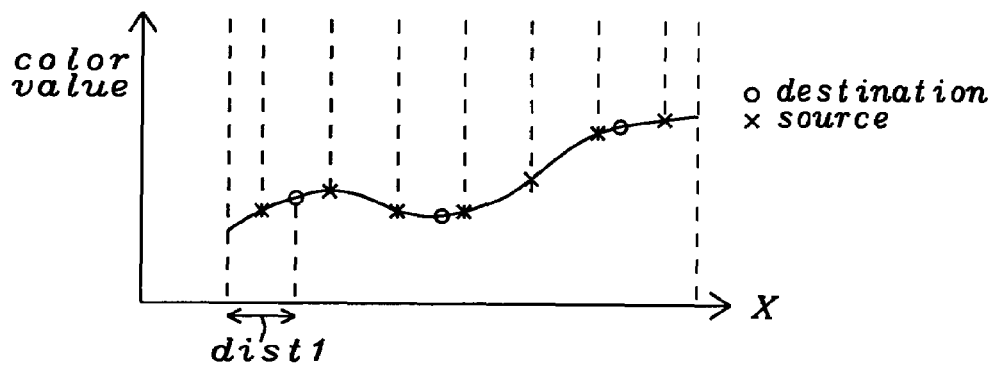

FIG. 1b shows a graph of pixel color values along a line of the source image 1 in x-direction and corresponding color values of the destination image 2. Symbol x signifies the pixel 3 color values of a row of the source image 1 (seven color values according to the seven pixels 3 shown in FIG. 1a); symbol o signifies the three-color pixel 4 values of a corresponding row of the destination image 2 (three values according to the three pixels 4 shown in FIG. 1a). Said three pixel values o of a row of the destination image 2 have been determined using a decimation filter, in a preferred embodiment of the invention by linear interpolation of neighboring pixels x as shown in FIG. 1b. The distance between the pixels o of the destination image 2 shown in the graph of FIG. 1b is defined by the offset scale in x-direction, compared to the distance between the pixels x of the source image 1:

$$\text{offsetx} = \frac{X_{SRC}}{X_{DES}},$$

wherein offsetx is the scale of decimation in x-direction, $X_{DES}$ is the number of pixels of the destination image; $X_{SRC}$ is the number of pixels of the source image. According to the example shown in FIGS. 1*a* and 1*b* the scale of decimation in x-direction offsetx=7/3. The distance dist1 of the middle of the first destination pixel from the edge of the image in x-direction is $$dist1 = \text{offsetx} \times \text{pixelwidth}/2,$$

wherein pixelwidth is the width of a source pixel in x-direction.

It has to be understood that said distance between the pixels o of the destination image and the location in the graph, as shown in the graph of FIG. 1*b*, is an artificial, or "virtual" distance or location, used for the purpose of interpolation only. In reality the destination image 2, being decimated by the scale 7:3 in x-direction and by the scale 4:2 in y-direction, will be smaller than the source image 1 and hence the graph of FIG. 1*b* does not show the physical distance or the physical location of the destination pixels o.

Figure 2:
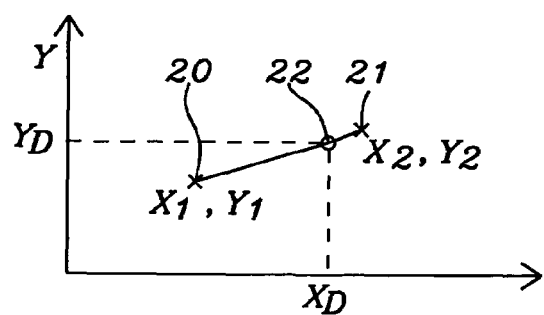
FIG. 2 illustrates a linear interpolation.

FIG. 2 describes how a linear interpolation is performed to calculate a color value of a pixel of a destination image. Source pixel 20 has the coordinate $x_1$ in x-direction and a color value of $y_1$, source pixel 21 has the coordinate $x_2$ in x-direction and a color value of $y_2$, and destination pixel 22 has the coordinate $X_d$ in x-direction. The correspondent color value $y_d$ of destination pixel 22 calculates $$y_d = y_1 + \frac{y_2 - y_1}{x_2 - x_1} \times (X_d - x_1).$$

In a preferred embodiment the linear interpolation method described above has been used. There is a multitude of different interpolation methods available, which could be used as well.

Figure 3A:
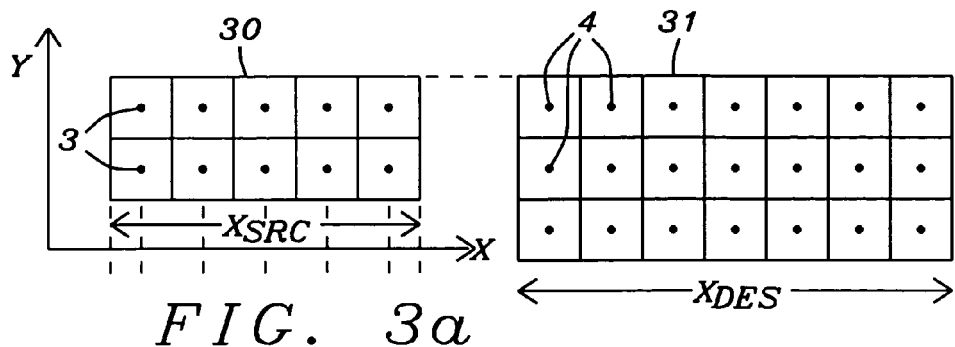

FIG. 3*a* shows an increase of the resolution of a digital image from, e.g., a resolution of 5×2 pixels to a resolution of 7×3 pixels. A source image 30 has five source pixels 3 in x-direction and two source pixels 3 in y-direction. A destination image 31 has seven destination pixels 4 in x direction and three destination pixels 4 in y direction. Consequently the destination image is larger than the source image.

Figure 3B:
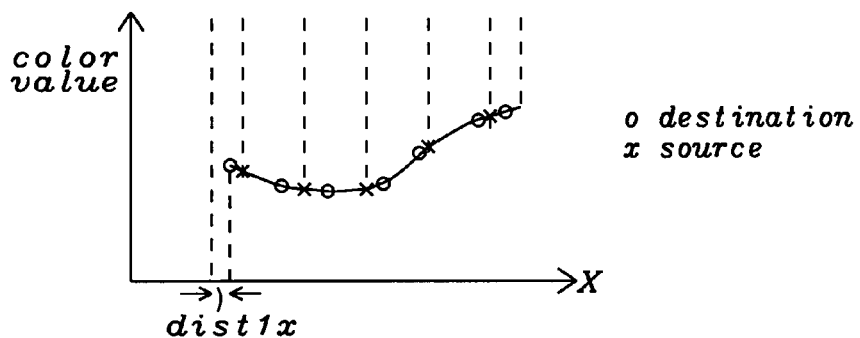

FIG. 3*b* shows a graph of a pixel color value of one row of the source image 30 in x-direction and corresponding color values of the destination image 31 as shown in FIG. 3*a*. Symbol x signifies the five pixel 3 color values of one row of the source image 30 (five values according to the source pixels 3 shown in FIG. 3*a*), symbol o signifies the seven destination pixel 4 values of the corresponding line of the destination image 31 (seven values according to the destination pixels 4 shown in FIG. 3*a*. Said pixel values o of a row of the destination image 31 have been determined by interpolation of the nearest source pixels, in a preferred embodiment of the invention by linear interpolation or extrapolation of neighboring pixels x as shown in FIG. 3*b*. The distance between the pixel values o of the destination image 2 shown in the graph of FIG. 1*b* is defined by the offset scale in x-direction, compared to the distance between the pixels x of the source image 30.

$$\text{offsetx} = \frac{X_{SRC}}{X_{DES}},$$

wherein offsetx is the scale of conversion in x-direction, $X_{DES}$ is the number of pixels of the destination image; $X_{SRC}$ is the number of pixels of the source image. According to the example shown in FIG. 3*a* and FIG. 3*b* the scale of decimation in x-direction offsetx=5/7. According to the example shown in FIG. 3*a* and FIG. 3*b* the distance dist1x of the middle of the first destination pixel from the edge of the image in x-direction is $$dist1x = \text{offsetx} \times \text{pixelwidth}/2,$$

wherein pixelwidth is the width of a source pixel in x-direction.

In case of an enlargement of a digital image the color values of additional pixels of the destination image are calculated by interpolation in x-direction from the nearest row of source pixels, as described above.

It has to be understood that said distance between the pixels o of the destination image, as shown in the graph of FIG. 3*b* is an artificial distance, used for the purpose of interpolation only. In reality the destination image 31, being enlarged by the scale 7:5 in x-direction and by the scale 3:2 in y-direction, will be larger than the source image 30.

The calculation of the color values of the destination pixels being located between the left side edge of the image and the first, or most left-sided, source pixel of a row in x-direction and accordingly between the right side edge of the image and the last, or most right-sided, source pixels of a line in x-direction can be performed by replicating said first or accordingly said last pixel of the nearest row of source pixels.

It is obvious to those skilled in art that rows and columns could be interchanged as well. This means that the interpolation, described above could be performed also in y-direction from the nearest column of the source image.

Figure 4:
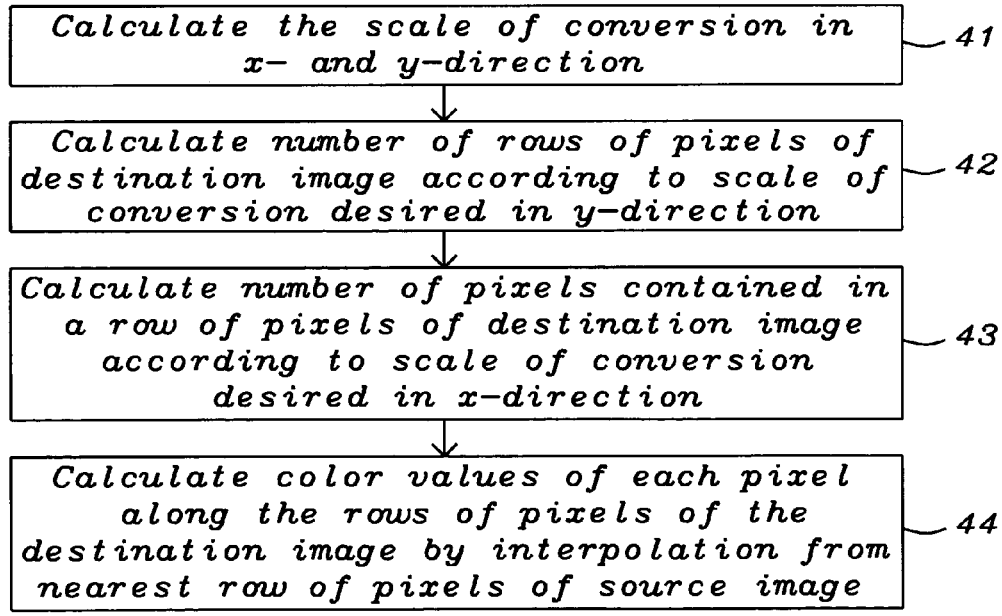
FIG. 4 shows a flowchart of the principal steps of a method to convert the resolution of a digital image.

FIG. 4 describes the principal steps of a method of the present invention to convert the resolution of a digital image. Step 41 describes the calculation of the scale of conversion in x and y-direction. The resolution could be decimated or enlarged, it is also possible to enlarge in one direction and decimate in the other direction. In step 42 the number of rows of pixels of the destination image is calculated according to the scale of conversion desired in y-direction, and in step 43 the number of pixels contained in a row of pixels of the destination image according to the scale of conversion desired in x-direction is calculated. Finally, in step 44, the color values of each pixel along the rows of pixels of the destination image is calculated by interpolation from the nearest row of pixels of source image.

Figure 5:
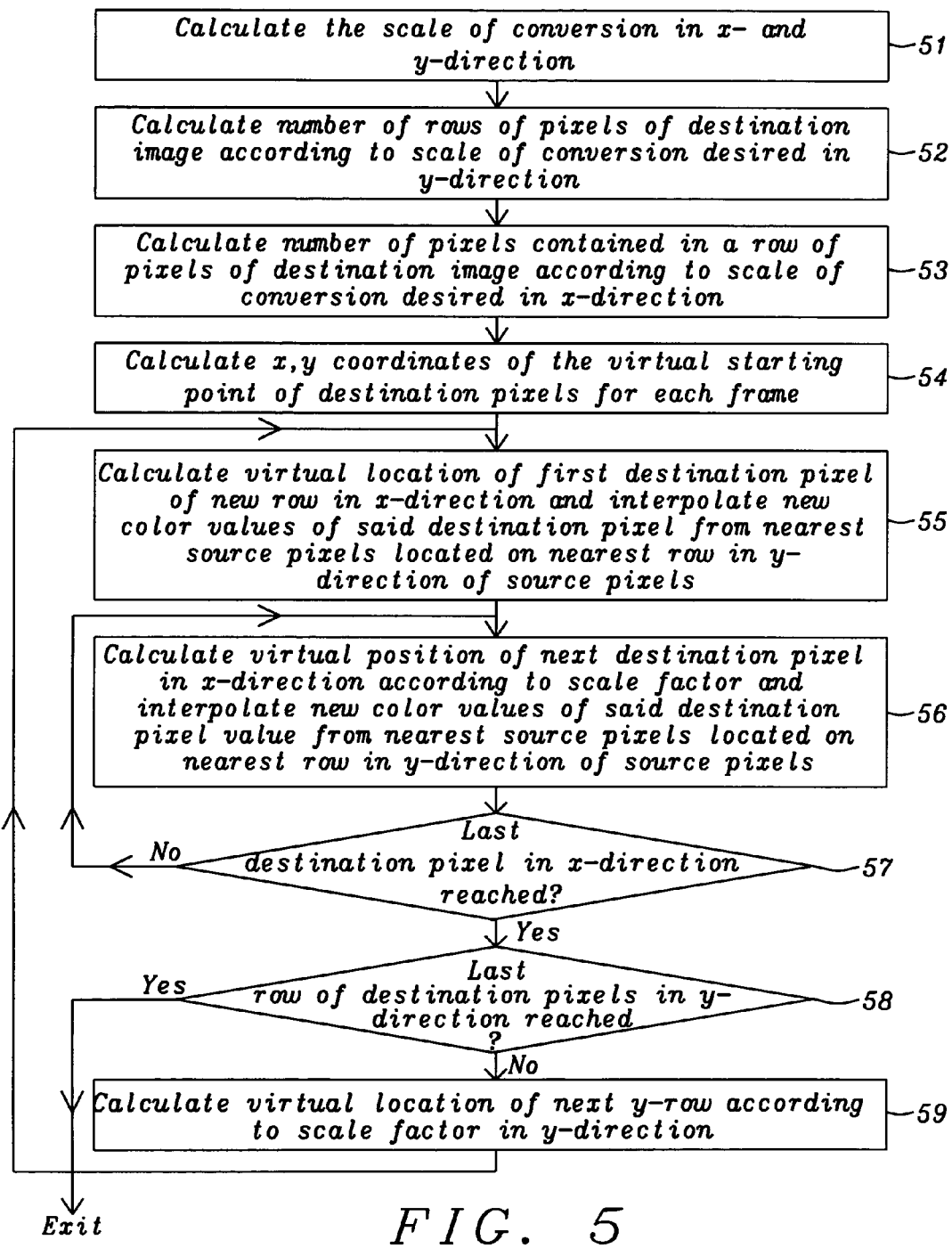
FIG. 5 shows a detailed flowchart of the method how to convert the resolution of a digital image.

FIG. 5 describes in more details a method of the present invention to convert the resolution of a digital image. Said conversion could be decimation or increase of a resolution in any direction. The first step 51 of said method comprises the calculation of the scale of conversion in x- and y-direction. Using the example shown in FIG. 1*a*, wherein the resolution has been decimated, the scale of decimation is 7:3 in x-direction and 4:2 in y-direction. In case of an increase of the resolution as shown e.g. in FIG. 3*a* the scale of conversion is 5:7 in x-direction and 2:3 in y-direction. The next step 52 comprises the calculation of number of rows of pixels of the destination image according to the scale of conversion desired in y-direction. According to the example shown in FIG. 1a said number of rows is two. The following step 53 describes the calculation of the number of pixels contained in a row of pixels of the destination image according to the scale of conversion desired in x-direction. According to the example shown in FIG. 1a said number of pixels in a row is three. The following step 54 comprises the calculation of the x, y coordinates of the virtual starting point of destination pixels for a new frame. Said starting point, which is the middle of the first pixel, is calculated using the conversion scales calculated in the previous step. As described earlier the location of the starting point calculated is a "virtual" location, it is used for interpolation only. It does not describe the actual physical location of the destination pixel. Using the examples shown in FIG. 1b the "virtual" distance dist1x of the middle of the first pixel from the edge of the image in x-directions is:

$$Dist1x=7/3 \times pixelwidthx/2,$$

wherein pixelwidthx is the width of a source pixel in x-direction. Using the conversion example shown in FIG. 1a the distance dist1y of the middle of the first pixel from the edge of the image in y-directions is:

$$dist1y=4/2 \times pixelwidthy/2,$$

wherein pixelwidthy is the width of a source pixel in y-direction. Usually the pixelwidth of a source image is identical in x- and y-direction. As explained above said distance dist1y is used to locate and identify the nearest row of pixels of the source image and distance dist1x is used to locate the nearest pixels of said nearest row of the source image for the purpose of interpolation in x-direction. In step 55 the starting point of the first destination pixel in x-direction for a new row and the color values of said first pixel of a new row of the destination image are calculated. The number of color values to be calculated depends upon the color space used. The calculation of the starting point of step 55 is identical to the calculation used in step 54. Furthermore the color values of the first pixel of a new row of the destination image are calculated by interpolation. In a preferred embodiment a linear interpolation of the color values of the two nearest pixels of the source image has been used. All color values of the color space used get interpolated to define the colors of the first pixel of a new line of the destination image. This could be e.g. RGB, YcbCr, YUV or any other color space comprising three or more colors.

In case YUV color space is used luminance would be handled the same way as chrominance. Any polynomial of nth order could be used for interpolation, although order 0 (taking the color value of the nearest pixel) and order 1 (linear interpolation of the color values of the nearest two pixels) are the simplest polynomials to be used. In a preferred embodiment an interpolation of order 1 is used with the exception of pixels of the destination image having a virtual position between the first, or most left-sided, pixel of the nearest row of the source image and the left side edge of the image or correspondingly between the last, or most right-sided, pixel of the nearest row of the source image and the right-side edge of the image. For these "peripheral" pixels an interpolation of the order 0 is used, this means the first, or correspondingly, the last pixel of the nearest row of the source image is replicated.

In the following step 56 the "virtual" position of the next destination pixel in x-direction of the current y-line according to the scale factor is calculated as described above, and the correspondent color values of all colors of the color space used are calculated by an interpolation of the correspondent color values of the nearest source pixels.

The next step 57 checks if the last pixel location in the current y-line of the destination imaged has been reached. In case the last pixel location has not been reached the process flow goes back to step 56 and the next "virtual" location is calculated and the correspondent color values are interpolated. In case the last destination location in x-direction has been reached the process flow goes to step 58. Step 58 checks if the last row in y-direction has been reached. In case the last row in y-direction has been reached the resolution of the source image has been successfully converted and the process flow goes to exit. In case the last row in y-direction has not yet reached, the process flow goes to step 59 wherein the "virtual" position of the next row in y-direction of the destination image is calculated and then the process flow goes back to step 55 wherein the location of the first pixel of the new y-row of the destination image and the correspondent color values of said pixel line are calculated.

While the invention has been particularly shown and described with reference to the preferred embodiments thereof, it will be understood by those skilled in the art that various changes in form and details may be made without departing from the spirit and scope of the invention.

What is claimed is:

1. A method to convert a resolution of a digital color image using any color space comprises the following steps:
    (1) calculate scale of conversion of the resolution of a source image to a destination image in x- and y-direction;
    (2) calculate number of rows of pixels of the destination image according to scale of conversion desired in y-direction;
    (3) calculate number of pixels contained in a row of pixels of the destination image according to scale of conversion desired in x-direction; and
(4) calculate color values of each pixel along the rows of pixels of the destination image by interpolation from nearest row of pixels of source image wherein the color values of the pixels of the destination image being located between the left side edge of the source image and the first pixel of the nearest row of pixels of the source image and the color values of the pixels of the destination image being located between the right side edge of the source image and the last pixel of the nearest row of the source image are provided by replicating the color values of said first, or correspondingly said last, pixel of the nearest row of the source image, wherein said digital color image is used in a digital camera.

2. A method of claim 1 wherein a linear interpolation has been used.

3. The method of claim 1 wherein said color space is a R-G-B color space.

4. The method of claim 1 wherein said color space is an YCbCr color space.

5. The method of claim 1 wherein said digital image is a video image.

6. The method of claim 1 wherein said digital image is an image from a digital camera.

7. The method of claim 1 wherein said method invented is used to decimate said image in any direction.

8. The method of claim 1 wherein said method invented is used to enlarge said image in any direction.

9. The method of claim 1 wherein said method invented is used to enlarge or to decimate said image in any direction.

10. The method of claim 1 wherein said method invented is implemented using one common software program.

11. A method to convert a resolution of a digital color image using any color space comprises the following steps:
    (1) calculate scale of conversion of the resolution of a source image to a destination image in x- and y-direction;

(2) calculate number of columns of pixels of the destination image according to scale of conversion desired in x-direction;

(3) calculate number of pixels contained in a column of pixels of the destination image according to scale of conversion desired in y-direction; and (4) calculate color values of columns of pixels of the destination image by interpolation from nearest column of pixels of source image wherein the color values of the pixels of the destination image being located between the upper side edge of the source image and the first pixel of the nearest column of pixels of the source image and the color values of the pixels of the destination image being located between the bottom side edge of the source image and the last pixel of the nearest column of the source image are provided by replicating the color values of said first, or correspondingly said last, pixel of the nearest column of the source image, wherein said digital color image is used in a digital camera.

12. The method of claim 11 wherein a linear interpolation method has been used.

13. The method of claim 11 wherein said color space is a R-G-B color space.

14. The method of claim 11 wherein said color space is an YCbCr color space.

15. The method of claim 11 wherein said digital image is a video image.

16. The method of claim 11 wherein said digital image is an image from a digital camera.

17. The method of claim 11 wherein said method invented is used to decimate said image in any direction.

18. The method of claim 11 wherein said method invented is used to enlarge said image in any direction.

19. The method of claim 11 wherein said method invented is used to enlarge or to decimate said image in any direction.

20. The method of claim 11 wherein said method invented is implemented using one common software program.

21. A method to convert a resolution of a digital color image comprises the following steps:
   (1) calculate the scale of decimation of the resolution of a source image to a destination image in x- and y-direction;
   (2) calculate number of rows of pixels of the destination image according to scale of conversion desired in y-direction;
   (3) calculate number of pixels contained in a row of pixels of the destination image according to scale of conversion desired in x-direction;
   (4) calculate x, y virtual starting point of a destination pixel for each frame;
   (5) calculate virtual location of first destination pixel for new row in x-direction and interpolate new color values of color space of said first destination pixel from nearest source pixels located at nearest row of source pixels in y-direction;
   (6) calculate virtual position of next destination pixel in x-direction according to scale factor and interpolate new color values of color space used of said next pixel from nearest source pixels located at nearest row of source pixels in y-direction wherein the color values of the pixels of the destination image being located between the upper side edge of the source image and the first pixel of the nearest column of pixels of the source image and the color values of the pixels of the destination image being located between the bottom side edge of the source image and the last pixel of the nearest column of the source image are provided by replicating the color values of said first, or correspondingly said last, pixel of the nearest column of the source image;
   (7) go to next step (8) if last destination pixel in x-direction has been reached otherwise go to step (6);
   (8) go to exit (10) if last row of destination pixels has been reached otherwise go to next step (9);
   (9) calculate virtual location of next row in y-direction according to scale factor in y-direction and go to step (5); and
   (10) exit, wherein said digital color image is used in a digital camera.

22. The method of claim 21 wherein a linear interpolation method has been used.

23. The method of claim 21 wherein said color space is a R-G-B color space.

24. The method of claim 21 wherein said color space is an YCbCr color space.

25. The method of claim 21 wherein said digital image is a video image.

26. The method of claim 21 wherein said digital image is an image from a digital camera.

27. The method of claim 21 wherein said method invented is used to decimate said image in any direction.

28. The method of claim 21 wherein said method invented is used to enlarge said image in any direction.

29. The method of claim 21 wherein said method invented is used to enlarge or to decimate said image in any direction.

30. The method of claim 21 wherein said method invented is implemented using one common software program.

31. A method to convert a resolution of a digital color image comprises the following steps:
   (1) calculate the scale of decimation of the resolution of a source image to a destination image in x- and y-direction;
   (2) calculate number of rows of pixels of the destination image according to scale of conversion desired in y-direction;
   (3) calculate number of pixels contained in a row of pixels of the destination image according to scale of conversion desired in x-direction;
   (4) calculate x, y virtual starting point of a destination pixel for each frame;
   (5) calculate virtual location of first destination pixel for new column in y-direction and interpolate new color values of color space of said first destination pixel from nearest source pixels located at nearest column of source pixels in x-direction;
   (6) calculate virtual position of next destination pixel in y-direction according to scale factor and interpolate new color values of color space used of said next pixel from nearest source pixels located at nearest column of source pixels in x-direction wherein the color values of the pixels of the destination image being located between the upper side edge of the source image and the first pixel of the nearest column of pixels of the source image and the color values of the pixels of the destination image being located between the bottom side edge of the source image and the last pixel of the nearest column of the source image are provided by replicating the color values of said first, or correspondingly said last, pixel of the nearest column of the source image;
   (7) go to next step (8) if last destination pixel in y-direction has been reached otherwise go to step (6);
   (8) go to exit (10) if last row of destination pixels has been reached otherwise go to next step (9);

(9) calculate virtual location of next row in x-direction according to scale factor in x-direction and go to step (5); and
(10) exit, wherein said digital color image is used in a digital camera.

* * * * *